US012771999B2

(12) United States Patent
Swann et al.

(10) Patent No.: US 12,771,999 B2
(45) Date of Patent: Oct. 20, 2026

(54) AVIATION HEADSET

(71) Applicant: Garmin International, Inc., Olathe, KS (US)

(72) Inventors: Thaddeus M. Swann, Olathe, KS (US); David M. Barbosa, Olathe, KS (US); Eric D. Miller, Olathe, KS (US); Tyler H Van Slyke, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 119 days.

(21) Appl. No.: 18/738,883

(22) Filed: Jun. 10, 2024

(65) Prior Publication Data

US 2025/0380087 A1 Dec. 11, 2025

(51) Int. Cl.

*H04R 5/033* (2006.01)
*B64D 11/00* (2006.01)
*H04R 5/04* (2006.01)
*H04S 7/00* (2006.01)

(52) U.S. Cl.

CPC ............... *H04R 5/033* (2013.01); *H04R 5/04* (2013.01); *H04S 7/304* (2013.01); *B64D 11/00151* (2014.12); *H04R 2201/107* (2013.01); *H04R 2460/07* (2013.01); *H04R 2499/13* (2013.01)

(58) Field of Classification Search

CPC .... H04R 5/033; H04R 5/04; H04R 2201/107; H04R 2460/07; H04R 2499/13; H04S 7/304; B64D 11/00151

USPC .......................................................... 381/370

See application file for complete search history.

(56) References Cited

U.S. PATENT DOCUMENTS

| | | | | |
|---|---|---|---|---|
| 11,671,783 | B2 | 6/2023 | Stanek et al. | |
| 2014/0153751 | A1* | 6/2014 | Wells | H04S 7/304 381/74 |
| 2021/0006918 | A1* | 1/2021 | Munoz | H04S 3/02 |
| 2022/0070585 | A1* | 3/2022 | Chen | H04R 1/1041 |
| 2023/0131605 | A1* | 4/2023 | Andrikowich | H04R 1/10 381/55 |
| 2024/0334112 | A1* | 10/2024 | Treat | H04R 5/033 |

OTHER PUBLICATIONS

Printout from Garmin® brings home theater sound quality to the cockpit with the GMA™ 345/342—Garmin Newsroom published prior to Jun. 10, 2024.

Printout from https://cardosystems.com/products/packtalk-edgephones published prior to Jun. 10, 2024.

Printout from https://eartec.com/ultralite/ published prior to Jun. 10, 2024.

(Continued)

*Primary Examiner* — Sean H Nguyen

(74) *Attorney, Agent, or Firm* — Samuel M. Korte; Kathleen D. Fitterling

(57) ABSTRACT

An aviation headset can include a microphone, a port configured to accept a cord for coupling with an audio panel, a transceiver, a speaker, and a processor coupled to the microphone, the port, the transceiver, and the speaker. The processor can be configured to receive an audio signal from the audio panel, determine a relative direction of a headset corresponding to the audio signal, and based on the relative direction, play the audio signal as three-dimensional (3D) audio through the speaker.

13 Claims, 6 Drawing Sheets

(56) References Cited

OTHER PUBLICATIONS

Printout from https://www.came-tv.com/pages/kuminik8 published prior to Jun. 10, 2024.

Printout from https://www.garmin.com/en-US/p/759559 published prior to Jun. 10, 2024.

Printout from https://www.lightspeedaviation.com/wp-content/uploads/2024/03/LSDeltaZulu_UG_324.pdf published prior to Jun. 10, 2024.

* cited by examiner

AVIATION HEADSET

BACKGROUND

In the field of aviation, it is common for pilots to wear an aviation headset while flying an aircraft. Aviation headsets can help block or filter cabin noise, protect against hearing loss, and improve communication within the airplane as well as over the radio. Radio communications can include communications with other aircraft, with air traffic control, or with others on the ground. In general aviation (as opposed to commercial aviation), passengers in an aircraft may also wear an aviation headset to facilitate communication with other passengers and/or with the aircraft crew. Aviation headsets can also be used to listen to media, such as music or podcasts, during a flight and to interface with a mobile device, such as a phone or tablet.

Typically, aviation headsets are coupled to an intercom system and/or an aviation audio panel by a wired connection. The aviation headset includes a cord and wired connectors configured to be plugged into jacks that are connected to the intercom system and/or the aviation audio panel. In general aviation (GA), one example of the wired connectors is referred to as a GA plug or dual plug and includes a first plug for the aviation headset to receive audio and a second plug to receive power to a microphone of the aviation headset and transmit audio therefrom. However, the GA plug does not provide power to the aviation headset for other functions, such as active noise reduction or Bluetooth. Another example of wired connectors for GA is the 6-pin Lemo or Redel plug, which, unlike the GA plug, is capable of providing additional power to the aviation headset. Aviation headsets for helicopters typically feature a U174 helicopter plug, which is a single plug connection that is not compatible with GA fixed aviation audio wing systems. Aviation headsets for the commercial airline industry typically use either the GA plug or an XLR plug. The XLR plug can include three or five pins providing power, microphone, and audio. Many aviation headsets, particularly those that do not include wired connectors configured to provide additional power to the aviation headset beyond the microphone, include an external battery pack for providing additional power thereto. The external battery pack is typically inline with the cord near the wired connectors.

BRIEF DESCRIPTION OF THE DRAWINGS

The detailed description references the accompanying figures. The use of the same reference numbers in different instances in the description and the figures may indicate similar or identical items. In addition, the proportion and the relative scale of the elements provided in the figures are intended to illustrate various embodiments of the present disclosure and are not to be used in a limiting sense.

DETAILED DESCRIPTION

Figure 1:
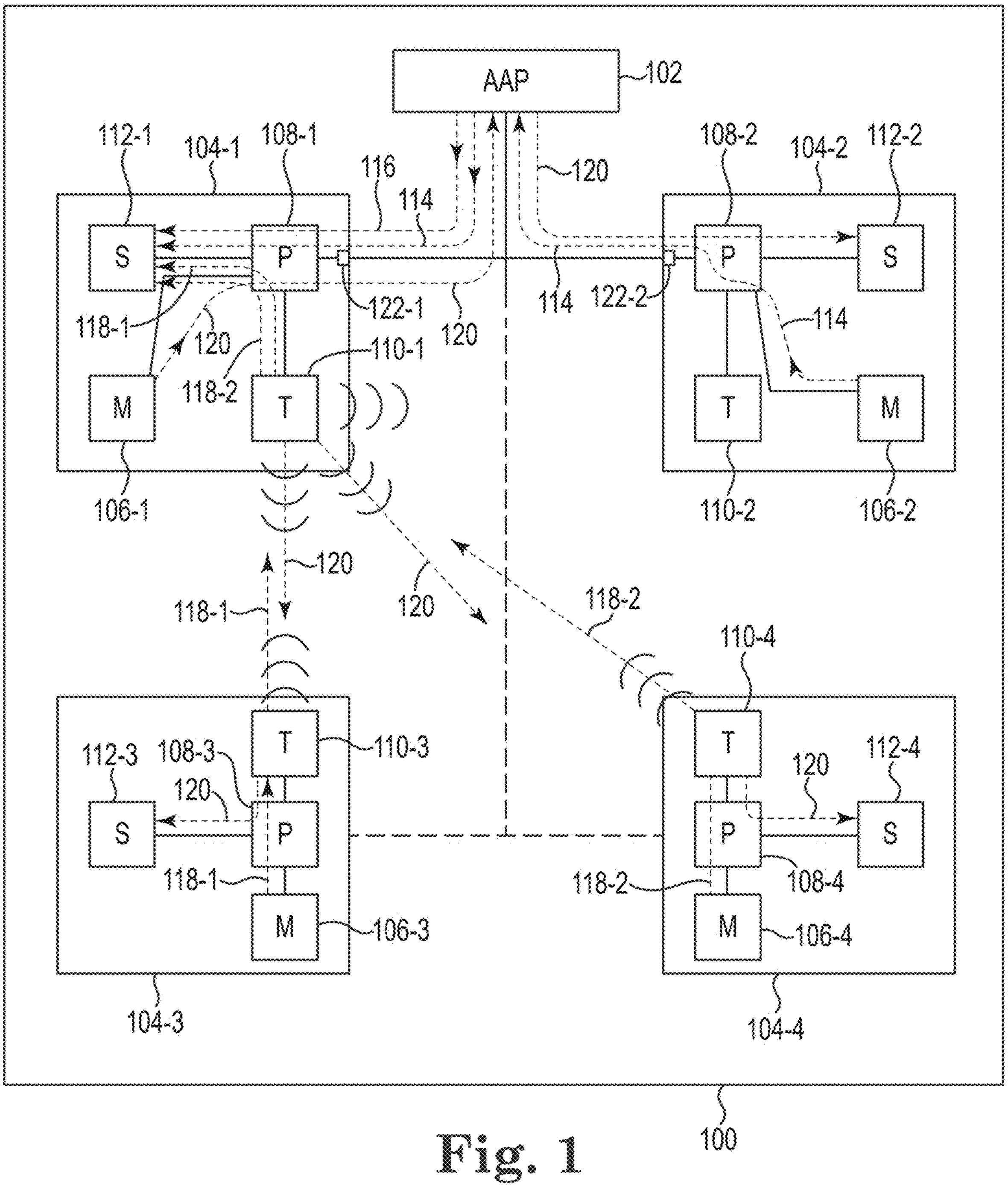
FIG. 1 is a block diagram of an aviation audio system.

The present disclosure includes an aviation headset operable to be used with an aircraft. In an aircraft, there may be two or more crew members (pilot and co-pilot) in the front of the aircraft and two or more passengers in the rear of the aircraft. In some cases, each of the four occupants may use an aviation headset during the flight. The arrangement and relative positioning of the occupants in the aircraft is similar to what it would be in a typical sedan. However, in the sedan, typically no one would be wearing a headset. Although the cabin of a sedan is not always quiet (e.g., due to road noise, engine noise, airflows, radio volume, etc.) typically, the occupants can converse with each other without the aid of a headset or other electronic amplification. Furthermore, when one occupant speaks, the other occupants can tell where the audio is coming from even if they are not looking at the speaker, due to the human capability of sound localization. The human brain performs sound localization based on a number of factors, such as the difference in intensity of received sound (mechanical vibrations in the air caused by a person speaking, in this example) between left and right ears and spectral information. However, in an aircraft, where the occupants are all wearing aviation headsets, the listeners do not receive the mechanical vibrations in the air caused by the person speaking, but instead receive a replication thereof from the speakers in their aviation headset. While the sound of the speaker's voice may be reproduced faithfully, the location information is lost.

At least one embodiment described herein addresses the above and other deficiencies. Some aviation headsets according to the present disclosure can operate in a wireless fashion, without the requirement of a cable and/or wired connectors being connected to the headset. Such an aviation headset would avoid the shortcomings described above that are associated with wired aviation headsets. The aviation headset can reproduce audio three-dimensionally, for example, in order preserve location information of the source of the audio. The aviation headset can include a microphone, a port configured to accept a cord for coupling with an audio panel, a transceiver, a speaker, and a processor coupled to the microphone, the port, the transceiver, and the speaker. The processor can be configured to receive an audio signal from the audio panel, determine a relative direction of a headset corresponding to the audio signal, and based on the relative direction, play the audio signal as three-dimensional (3D) audio through the speaker. Other advantages of the present disclosure are described in more detail below in association with the accompanying figures.

The figures herein follow a numbering convention in which analogous elements within a figure may be referenced with a hyphen and extra numeral or letter. See, for example, elements 104-1, 104-2, 104-3, 104-4 in FIG. 1. Such analogous elements may be generally referenced without the hyphen and extra numeral or letter. For example, elements 104-1 . . . 104-4 may be collectively referenced as 104.

FIG. 1 is a block diagram of an aviation audio system. The environment of the aviation audio system is internal to an aircraft 100 including an aviation audio panel 102. The aviation audio panel 102 may be referred to herein simply as an audio panel. The audio panel 102 can be used to control audio in the aircraft 100, including use of the intercom, which allows for communication between occupants of the aircraft 100. The audio panel 102 can provide functionality, such as distributing audio to a number of aviation headsets 104-1, 104-2, 104-3, 104-4. The audio panel 102 can control which headsets 104 have access to which audio sources, provide squelch control, provide volume control, allow for audio source selection, provide charging for mobile devices via a universal serial bus (USB) connection, allow for wireless (e.g., Bluetooth) connectivity, among other functions.

In the example of FIG. 1, the audio panel 102 is illustrated as having a wired connection (indicated by the solid line) to the aviation headset 104-1 and 104-2 (e.g., crew headsets) and wireless connections (indicated by the dashed line) to the aviation headsets 104-3, 104-4 (e.g., passenger headsets). However, embodiments are not so limited. Any of the aviation headsets 104 can connect to the audio panel 102 in a wired or wireless manner. In some examples, although the crew headsets 104-1, 104-2 may be capable of connecting to the audio panel 102 wirelessly, a wired connection may be maintained to preserve push to talk (PTT) functionality for a particular aircraft 100. PTT allows a crew member to push a momentary switch (button) to cause a two-way radio of the aircraft 100 to change from reception mode to transmit mode for voice communications from the crew.

The aviation headsets 104 can include a microphone 106, a processor 108, a transceiver 110, and a speaker 112. In some embodiments, the aviation headsets 104 can include a port 122 configured to accept a cable for coupling with the audio panel 102. The port 122 can be coupled to the processor 108. In some embodiments, the port 122 is a USB port, data cable port, audio cable port, or other type of connector. In addition to accepting the cable, the port 122 can also be configured to receive power via an attached cable and can thereby be used to charge a battery (not specifically illustrated) within the aviation headset 104. The battery can be used to provide power for the processor 108, the transceiver 110, and/or other components of the aviation headset 104 not specifically illustrated in FIG. 1 (e.g., noise canceling or noise reducing circuitry, lights, etc.). In some embodiments, the battery can provide additional power for the microphone 106 and/or the speaker 112.

The microphone 106 can be a transducer that is configured to receive sound from the user's mouth and convert it into electrical or optical audio signals for further processing by the processor 108. The microphone 106 can be coupled to the processor 108. In some embodiments, the microphone can be attached to a boom that is attached to an earcup of the aviation headset 104.

The processor 108 represents one or more general-purpose processors such as a microprocessor, a central processing unit (CPU), or the like. The processor can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processor 108 can be one or more special-purpose processing devices such as an application specific integrated circuit (ASIC), a field programmable gate array (FPGA), a digital signal processor (DSP), network processor, neural processing unit (NPU), or the like. The processor 108 can be configured to execute instructions for performing the operations and steps discussed herein.

Although not specifically illustrated, the aviation headsets 104 can also include memory. The memory can be read-only memory (ROM), flash memory, dynamic random access memory (DRAM) such as synchronous DRAM (SDRAM) or Rambus DRAM (RDRAM), etc. The memory can be static memory (e.g., flash memory, static random access memory (SRAM), etc.). The memory can be a data storage system.

The transceiver 110 can be a combination of an electromagnetic transmitter and receiver, operating, for example, in the radio spectrum. The transceiver 110 can transmit and receive electromagnetic signals wirelessly. Although not specifically illustrated, the transceiver 110 can include an antenna, either internal to the transceiver 110 or external to the transceiver 110. A non-limiting example of the transceiver 110 is a Bluetooth transceiver. In some embodiments, the transceiver 110 can represent more than one physical transceiver in the aviation headset 104. The transceiver 110 can be coupled to the processor 108.

The speaker 112 can represent one or more speakers such as a left speaker in a left earcup or in a left earbud and a right speaker in a right earcup or in a right earbud of the aviation headset 104. The speaker 112 can be coupled to the processor 108.

The processor 108-1 of the aviation headset 104-1 can be configured to receive an audio signal from the audio panel 102. For example, the audio signal can be a crew communication signal 114 that originated in the microphone 106-2 of the crew headset 104-2, was processed by the processor 108-2 of the crew headset 104-2, passed through the port 122-2 of the crew headset to the audio panel 102. The crew communication signal 114 can then be passed to the aviation headset 104-1 via the port 122-1 to be processed by the processor 108-1 for playing in the speaker 112-1. The processor 108-1 can be configured to determine a relative direction of the crew headset 104-2 corresponding to the crew communication signal 114.

In some embodiments, the determination of the relative direction of the crew headset 104-2 corresponding to the crew communication signal 114 can be made with the assistance of the audio panel 102. For example, in an aircraft 100 having only two crew members, the audio panel 102 can encode audio signals to/from either of the crew headsets 104-1, 104-2 with identifiers to indicate the source of the audio. The identification can be based on which jacks the respective crew headsets 104-1, 104-2 are plugged into (e.g., front-left is the pilot and front-right is the copilot). In such embodiments, the processor 108-1 can determine that the crew communication signal 114 was received from the crew headset 104-2, which is directly to the right of the crew headset 104-1.

In some embodiments, the determination of the relative direction of the crew headset 104-2 corresponding to the crew communication signal 114 can be made with the assistance of the transceiver 110-1. The transceiver 110-1 can be configured to determine the relative direction of the crew headset 104-2 utilizing wireless direction finding. The transceiver 110-1 can locate a relative direction to the transceiver 110-2 of the crew headset 104-2. In some embodiments, the transceivers 110 can be Bluetooth transceivers and the wireless direction finding can be Bluetooth direction finding. Additionally or alternatively, the transceivers 110 can employ ultra-wideband (UWB) technology and use UWB direction-finding techniques. The transceiver 110-1 can use angle of arrival and/or angle of departure information to determine the direction. With angle of arrival, the transceiver 110-1 can use multiple antennas arranged in an array to differentially receive a signal from the transceiver 110-2 and calculate the relative direction to the transceiver 110-2 based on differences in the reception of the signal from the transceiver 110-2 between the different antennas in the array. With angle of departure, the transceiver 110-1 can differentially receive signals from multiple transmitting antennas of the transceiver 110-1 and calculate the relative direction to the transceiver 110-2 based on differences between the reception of the multiple signals from the transceiver 110-2.

The processor 108-1 of the aviation headset 104-1 can be configured to play the audio signal (e.g., the crew communication signal 114) as 3D audio through the speaker 112-1 (including any number of speaker elements) based on the relative direction. "3D audio", as used herein, refers to any audio processing technology that uses spatial audio techniques to make it seem like different audio sources are coming from different directions to facilitate the user distinguishing one source from another. Thus, 3D audio does not necessarily use three-dimensional coordinates to simulate the location of audio sources as in some examples the directional audio provided by embodiments of the present invention can include left-right, forward-back, and combinations thereof.

The processor 108-1 can adjust audio in the aviation headset 104-1 to mimic how the human ear normally hears and registers sounds in space. 3 The crew communication signal 114 from the crew headset 104-2 can be played in the aviation headset 104-1 so as to make it sound like the audio is originating from the right side of the aviation headset 104-1.

The processor 108-1 of the aviation headset 104-1 can be configured to receive an audio signal from the audio panel 102 that is an ATC communication signal 116. The processor 108-1 of the aviation headset 104-1 can be configured to play the ATC communication signal 116 via the speaker 112-1 as 3D audio from a direction in front of the aviation headset 104-1. In many aircraft 100, the pilot sits in the front-most seat and so it may be natural for the pilot to think of ATC communications as coming from a direction in front of the pilot, where no other crew or passengers are located. Such embodiments can allow the pilot to passively differentiate ATC communications from other communications originating within the aircraft 100.

The transceiver 110-1 of the aviation headset 104-1 can be configured to receive a passenger communication signal 118-1 from a passenger headset 104-3. In some embodiments, the communication signal 118-1 from the passenger headset 104-3 can be received wirelessly, without being passed through the audio panel 102. The passenger communication signal 118-1 can be received by the microphone 106-3, processed by the processor 108-3, and transmitted by the transceiver 110-3 of the passenger headset 104-3 to the transceiver 110-1 of the aviation headset 104-1. The transceiver 110-1 can determine a relative direction of the passenger headset 104-3 and based on the determined relative direction, play the passenger communication signal 118-1 as 3D audio through the speaker 112-1. The transceiver can perform an analogous task for a passenger communication signal 118-2 from the passenger headset 104-4. The passenger communication signal 118-2 can be received by the microphone 106-4, processed by the processor 108-4, and transmitted by the transceiver 110-4 of the passenger headset 104-4 to the transceiver 110-1 of the aviation headset 104-1. The transceiver 110-1 can determine a relative direction of the passenger headset 104-4 and based on the determined relative direction, play the passenger communication signal 118-2 as 3D audio through the speaker 112-1. The aviation headset 104-1 can thereby provide differentiation between different communications from different sources by making it sound to the user as though the communications are coming from different directions. Embodiments are not limited to the quantity of crew members and passengers illustrated in FIG. 1.

The processor 108-1 of the aviation headset 104-1 can be configured to receive a pilot communication signal 120 from the microphone 106-1. The processor 108-1 can be configured to transmit the pilot communication signal 120 via the audio panel 102 to the crew headset 104-2, where it can be processed by the processor 108-2 and played via the speaker 112-2. In some embodiments, the crew headset 104-2 can be configured to play the pilot communication signal 120 as 3D audio analogously to the manner described in association with the aviation headset 104-1. The processor 108-1 can be configured to transmit the pilot communication signal 120 via the transceiver 110-1 to the passenger headset 104-3 and/or to the passenger headset 104-4. The passenger headsets 104-3, 104-4 can process the pilot communication signal 120 via the processors 108-3, 108-4 and play the pilot communication signal 120 via the speakers 112-3, 112-4. In some embodiments, the passenger headsets 104-3, 104-4 can be configured to play the pilot communication signal 120 as 3D audio analogously to the manner described in association with the aviation headset 104-1.

Although not specifically illustrated in FIG. 1, in some embodiments, the aviation audio system can be completely wireless, such that none of the aviation headsets 104 are coupled to the audio panel 102 in a wired fashion. In such embodiments, the audio panel 102 can act as a wireless hub for both radio communications and intercom communications between crew and passengers. The transceivers 110 of the aviation headsets 104 can wirelessly transmit audio signals to the audio panel 102 and wirelessly receive audio signals therefrom. The aviation headsets 104 need not be plugged into any external transceivers or communication system as the transceivers 110 are internal to the respective aviation headsets 104. Such embodiments can be useful to provide a fully wireless cabin within the aircraft 100 for comfort, convenience, and safety. Users need not worry about cords getting snagged, interfering with movement, or wired connectors coming loose during flight. The aviation audio system can work with any combination of wired and wireless aviation headsets.

Figure 2:
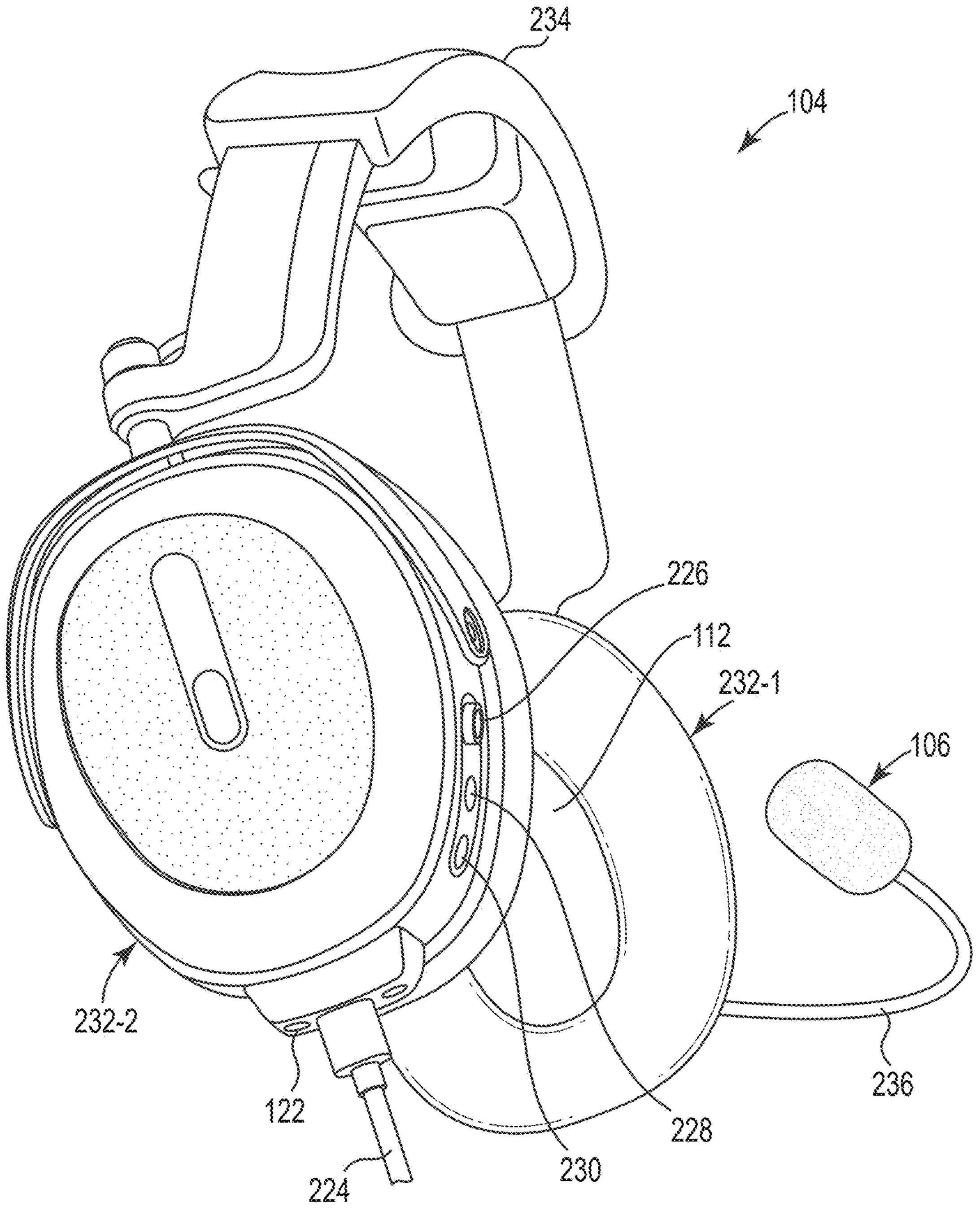
FIG. 2 is a perspective view of an aviation headset.

FIG. 2 is a perspective view of an aviation headset 104. The aviation headset 104 includes a microphone 106 coupled to a boom 236, at least one speaker 112, and a port 122 figured to accept a cable 224 for coupling with an audio panel. In the example illustrated in FIG. 2, the cable 224 is a USB cable, however embodiments are not so limited. Although not specifically illustrated in FIG. 2 due to being internal to the aviation headset 104, it also includes a processor and transceiver, as described herein.

The aviation headset 104 can include a headband 234 and earcups 232-1, 232-2. The earcups 232 can house the speakers 112. Although illustrated with earcups 232 in FIG. 2, embodiments are not limited to aviation headsets 104 that include earcups. In some embodiments, the aviation headset 104 may include earbuds in lieu of the earcups 232. Earcups 232 are designed to be worn over the ears, whereas earbuds are designed to be worn within the ear.

The aviation headset 104 can include a light switch 226. The light switch 226 can be a momentary switch (e.g., a button). As a non-limiting example, the light switch 226 can be included on a front side of the earcup 232-2. In this context, "front side" means the side facing the aircraft controls when worn by a pilot. The aviation headset 104 can include a red light 228 configured to illuminate an area in front of the aviation headset with red light. Red light may be useful during night operations to provide illumination within the cockpit while not affecting the user's night vision as much as other colors of light. The aviation headset 104 can include a white light 230 configured to illuminate an area in front of the aviation headset with white light. White light may be useful to provide light of brighter intensity for other night operations such as pre and post-flight operations where night vision is less of a concern. The aviation headset 104 can include lights of other colors. The light switch 226 can be coupled to the red light 228 and the white light 230. The light switch 226 can be used to control the red light 228 and the white light 230 as described in more detail with respect to FIG. 5.

Figure 3:
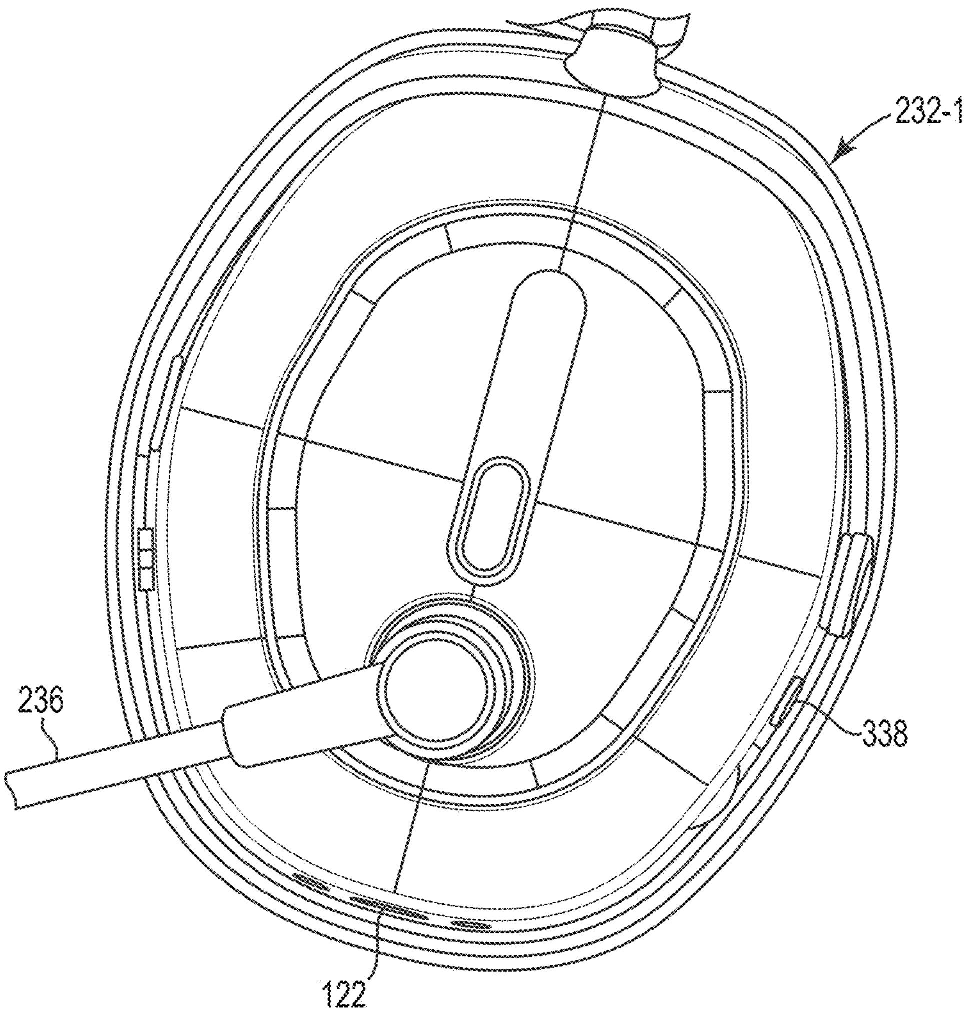
FIG. 3 is a first side view of a portion of an aviation headset.

FIG. 3 is a first side view of a portion of an aviation headset. In this view, the earcup 232-1 is visible. The port 122 is illustrated as being located on a bottom side of the earcup 232-1, as an example. A portion of the boom 236 for the microphone is visible. The aviation headset can include a multifunction switch 338. The multifunction switch 338 can be a momentary switch (e.g., a button). In this example, the multifunction switch 338 is located on a back side of the earcup 232-1 (e.g., a side of the earcup 232-1 that would face away from the aircraft controls when worn by a pilot). The multifunction switch 338 can be used to control media and phone calls from a mobile device or other source (e.g., a Bluetooth source). A first operation of the multifunction switch 338 (e.g., a short press) can cause media to play, pause, or resume. The first operation of the multifunction switch 338 can be used to answer an incoming call, hang up a current call, put a first call on hold and answer a second call, and/or hang up a first call and switch to a second call. A second operation of the multifunction switch 338 (e.g., a long press) can start a mobile device's virtual assistant, transfer call audio from the aviation headset to the mobile device, keep a first call and reject a second incoming call, and/or to switch calls. Other functions for the multifunction switch 338 can be defined.

Figure 4:
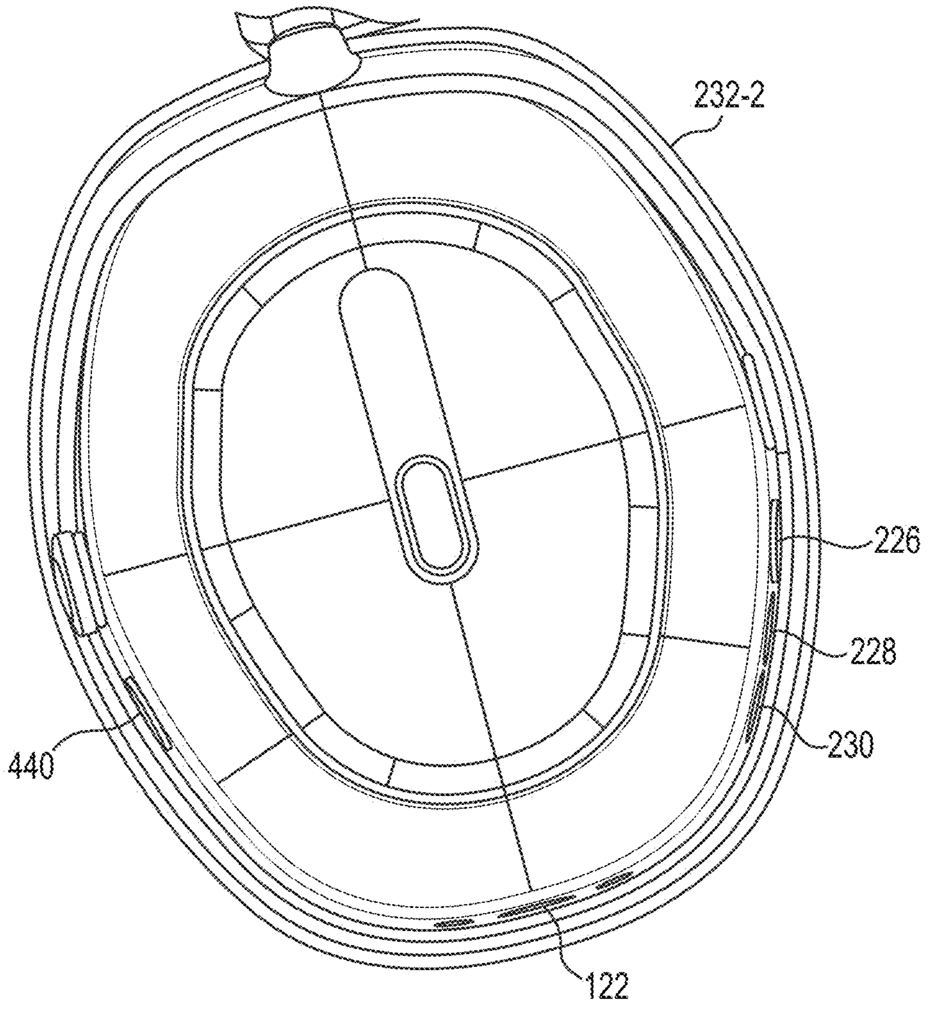
FIG. 4 is a second side view of a portion of an aviation headset.

FIG. 4 is a second side view of a portion of an aviation headset. In this view, the earcup 232-2 is visible. The light switch 226, red light 228, and white light 230 are illustrated on a front of the earcup 232-2. An isolation switch 440 is illustrated on the back side of the earcup 232-2. The isolation switch 440 can be a momentary switch (e.g., a button) and can be coupled to the processor of the aviation headset. A first operation of the isolation switch 440 (e.g., a short press) can cause passenger communication signals to be muted or unmuted (played through the speaker) for a user of the aviation headset. A second operation of the isolation switch 440 (e.g., a long press) can cause the aviation headset to tell the user how many other aviation headsets are coupled via the wireless intercom.

Figure 5:
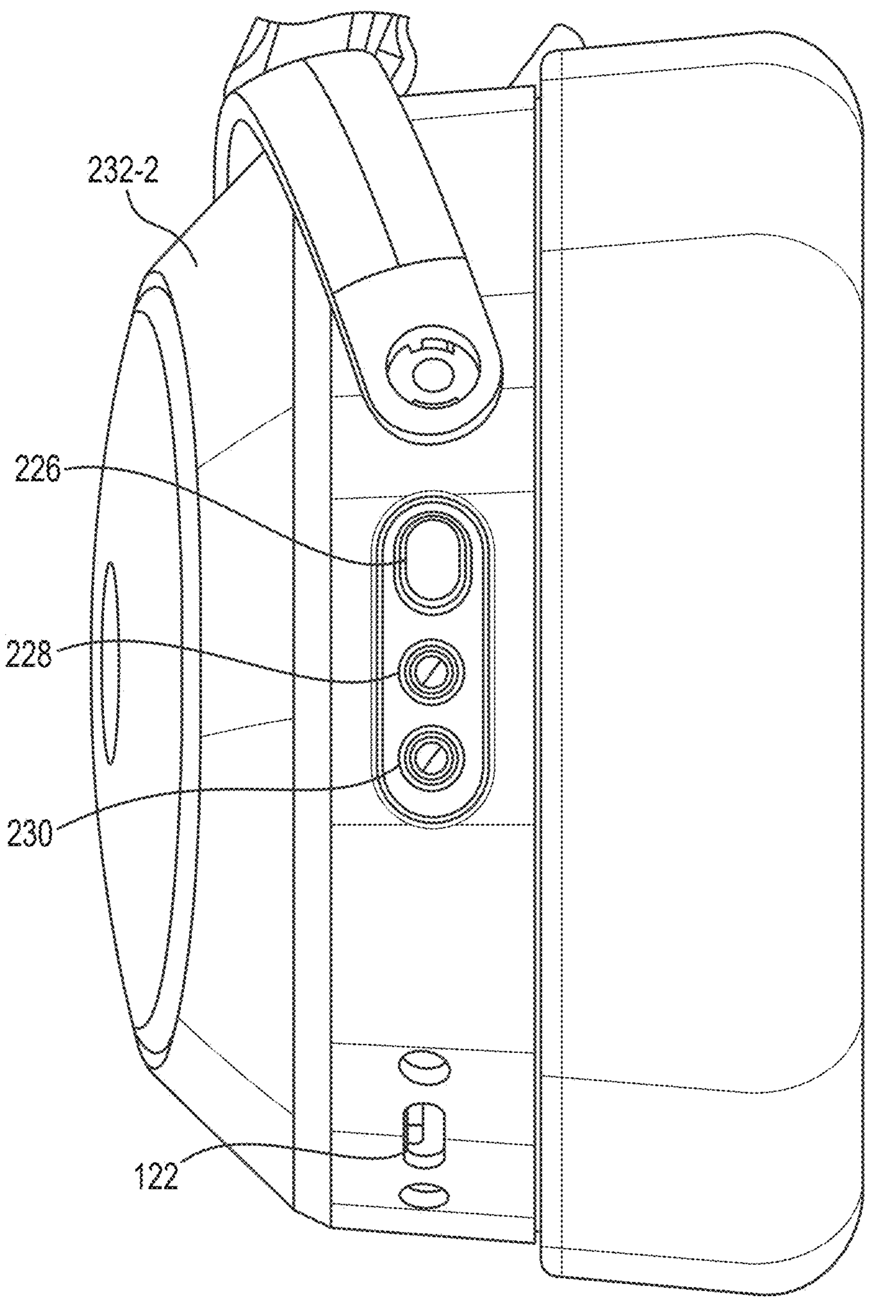
FIG. 5 is a front view of a portion of an aviation headset.

FIG. 5 is a front view of a portion of an aviation headset. In this view, the earcup 232-2 is visible, including the port 122, the light switch 226, the red light 228, and the white light 230. A first operation of the light switch 226 can cause the red light 228 to activate. A second, subsequent, operation of the light switch 226 can cause the red light 228 to deactivate and the white light 230 to activate. A third, subsequent, operation of the light switch 226 can cause the white light 230 to deactivate. However, in some embodiments, if either the red light 228 or the white light 230 has been on for a threshold amount of time (e.g., 10 seconds), then any subsequent operation of the light switch 226 can cause the active light to deactivate without activating another light. The lights 228, 230 may be controlled in finer detail by a graphical user interface (GUI) running on a mobile device. The GUI is described in more detail below with respect to FIG. 6.

Figure 6:
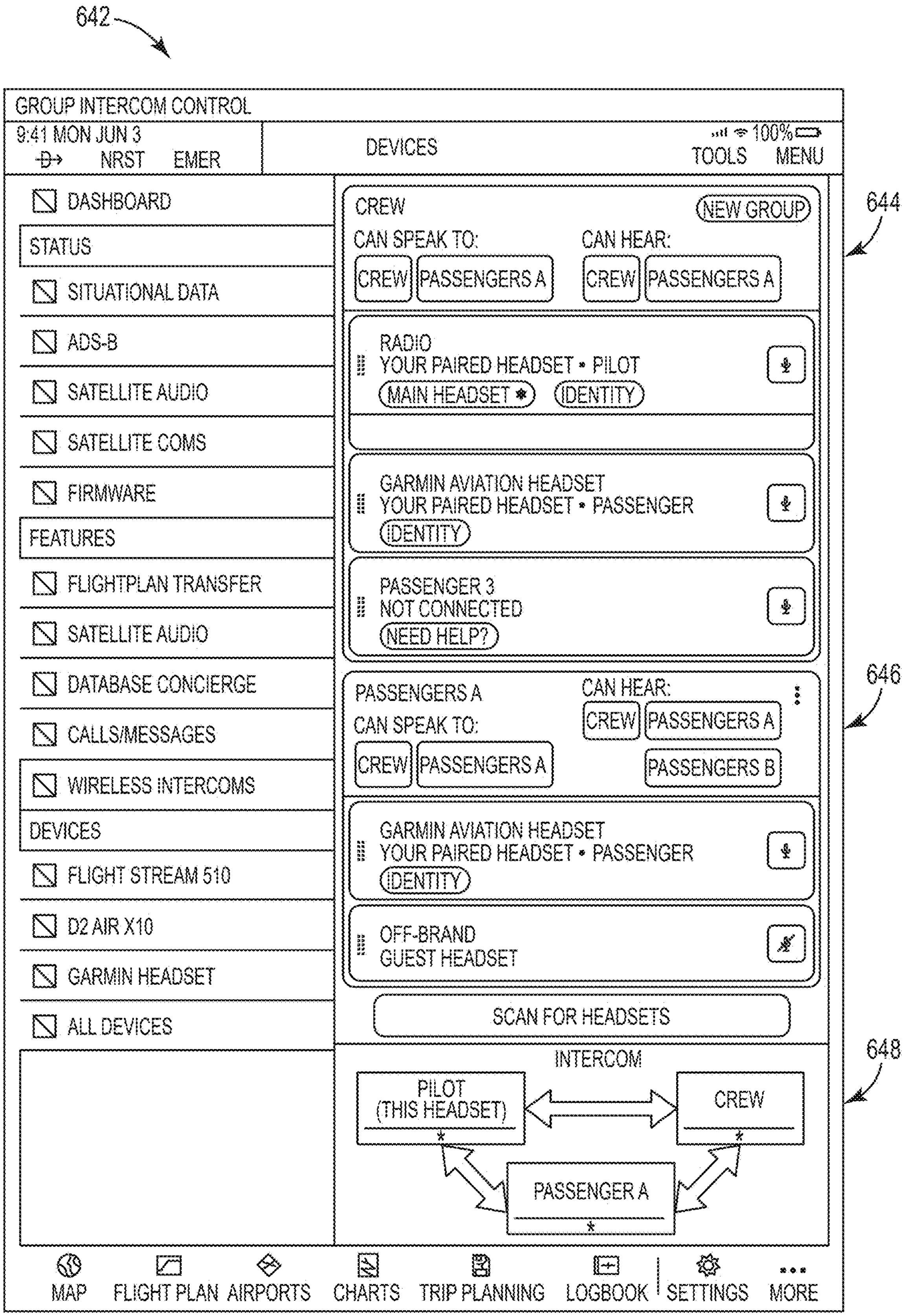
FIG. 6 is a block diagram of a graphical user interface associated with an aviation headset system.

FIG. 6 is a block diagram of a graphical user interface 642 associated with an aviation headset system. The GUI 642 can run on a mobile device, such as a smartphone or tablet, inside an aircraft. The GUI 642 can provide a myriad of functions to the pilot including full-featured navigation, aviation weather, flight plan filing, synthetic vision, logbooks, etc. The GUI 642 can interface with the audio panel in a wired (e.g., USB) or wireless (e.g., Bluetooth) fashion. The GUI 642 can interface with the aviation headsets in a wired (e.g., USB) or wireless (e.g., Bluetooth) fashion. The GUI 642 can be run on the mobile device as executable instructions (e.g., software), which can be stored on the mobile device.

The GUI 642 can be used to control features of the audio panel and/or the aviation headsets in the aircraft. As illustrated on the right side of the GUI 642, a list of connected aviation headsets can be presented. The GUI 642 can also display previously connected, but not currently connected aviation headsets to help identify what may be a problem with one of the headsets connecting to the GUI 642 or the audio panel. Each connected headset can have an identifier associated with it and presented on the GUI 642. For example, "Your Paired Headset", "Passenger 3", "Crew", etc. In some embodiments, the identifiers can initially be created by the GUI 642 based on the relative positioning of the aviation headsets within the aircraft, as described above with respect to FIG. 1. For example, an aviation headset to the immediate right of the pilot can be automatically identified as "Crew", an aviation headset immediately behind the pilot can be automatically identified as "Passenger 1", and an aviation headset diagonally behind the pilot can be identified as "Passenger 2." The GUI 642 can receive inputs to change the identifier of any of the headsets. For example, if a pilot has frequent crew or passengers, the pilot may wish to identify their headsets by name. As an added feature, the GUI 642 can include an intercom display 648 to graphically depict the detected locations of each headset within the aircraft. This can help the pilot identify each aviation headset and assure that they are connected correctly.

The GUI 642 can be used to control the intercom. The GUI 642 can include a crew control portion 644. The crew control portion 644 can receive inputs to define to whom the crew headsets can speak (who will receive audio signals from the crew headsets), suc3D h as other crew and/or passengers, or even individual other crew and passengers. The crew control portion 644 can receive inputs to define who the crew can hear (when audio signals will be played through speakers of the crew headsets), such as other crew and/or passengers.

The GUI 642 can include a passenger control portion 646. The passenger control portion 646 can receive inputs to define to whom the passenger headsets can speak (who will receive audio signals from the passenger headsets), such as crew and/or other passengers, or even individual other crew and passengers. The passenger control portion 646 can receive inputs to define who the passengers can hear (when audio signals will be played through speakers of the passenger headsets), such as crew, other passengers, and/or ATC.

During critical phases of the flight, the crew may wish to isolate themselves from passenger communications. This can be accomplished via the GUI 642 either via the crew control portion 644 or the passenger control portion 646. Some passengers may be interested in listening to crew and/or ATC communications related to the flight, while others may prefer not to hear that information. These preferences can be implemented via the GUI 642 either via the crew control portion 644 or the passenger control portion 646.

The GUI 642 can also be used to control distribution of other audio through the intercom. For example, music received via satellite audio may be played through the intercom to crew and/or passengers and controlled via the GUI. During certain phases of flight (e.g., takeoff, approach, and landing), the crew may wish not to hear the music, but the passengers may want to continue listening. The GUI 642 can allow such fine-grained control over who hears which audio signals and when. In some embodiments, one of the aviation headsets can be a primary headset for receipt of media audio and that aviation headset can broadcast it to other aviation headsets within the aircraft. For example with respect to FIG. 1, the aviation headset 104-1 can receive media audio from the audio panel 102 and wirelessly transmit it to the passenger headsets 104-3, 104-4. The passenger headsets 104-3, 104-4 do not then need to be connected to the audio panel 102 for receipt of media audio. This can allow for a more simplified media audio interface for the audio panel 102 and not require that the passenger headsets 104-3, 104-4 be wired into the audio panel 102. The transmission of such media audio can be controlled via the GUI 642.

The mobile device can include a data storage system having a machine-readable storage medium (also known as a computer-readable medium) on which is stored one or more sets of instructions or software embodying the GUI 642. The instructions can also reside, completely or at least partially, within a main memory and/or within a processing device during execution thereof by the mobile device, the main memory and the processing device also constituting machine-readable storage media.

The instructions include instructions to implement functionality corresponding to the GUI 642 described herein. The term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the mobile device to perform any one or more of the methodologies of the present disclosure. The term "machine-readable storage medium" shall accordingly be taken to include, but not be limited to, solid-state memories, optical media, and magnetic media, whether provided in a local or distributed manner (e.g., cloud storage).

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected and, unless stated otherwise, can include a wireless connection. As will be appreciated, elements shown in the various embodiments herein can be added, exchanged, and/or eliminated so as to provide a number of additional embodiments of the present disclosure.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An aviation headset, comprising:
- a microphone;
- a port configured to accept a cord for coupling with an audio panel;
- a transceiver;
- a speaker; and
- a processor coupled to the microphone, the port, the transceiver, and the speaker, wherein
  - the processor is configured to:
    - receive an audio signal from the audio panel;
    - determine a relative direction of a headset corresponding to the audio signal; and
    - based on the relative direction, play the audio signal as three-dimensional (3D) audio through the speaker;
- wherein the processor is configured to:
- receive a plurality of audio signals from the audio panel, the audio signals including a plurality of communication signals from a plurality of headsets and a plurality of air traffic control communication signals;
- determine a respective relative direction of each of the plurality of headsets; and
- based on the respective relative directions, play the communication signals as 3D audio through the speaker.

2. The aviation headset of claim 1, wherein the processor is configured to play the plurality of air traffic control communication signals through the speaker as 3D audio from a direction in front of the aviation headset.

3. An aviation headset, comprising:
- a microphone;
- a port configured to accept a cord for coupling with an audio panel;
- a transceiver;
- a speaker; and
- a processor coupled to the microphone, the port, the transceiver, and the speaker, wherein
  - the processor is configured to:
    - receive an audio signal from the audio panel;
    - determine a relative direction of a headset corresponding to the audio signal; and
    - based on the relative direction, play the audio signal as three-dimensional (3D) audio through the speaker;
- wherein the transceiver is configured to:
- receive a plurality of passenger communication signals from a plurality of passenger headsets;
- determine a respective relative direction of each of the plurality of passenger headsets; and based on the respective relative directions, play the passenger communication signals as 3D audio through the speaker.

4. An aviation headset, comprising:
a microphone;
a port configured to accept a cord for coupling with an audio panel;
a transceiver;
a speaker; and
a processor coupled to the microphone, the port, the transceiver, and the speaker, wherein
the processor is configured to:
receive an audio signal from the audio panel;
play the audio signal via the speaker;
receive a passenger communication signal via the transceiver;
determine a relative direction of a passenger headset corresponding to the passenger communication signal; and
based on the relative direction, play the passenger communication signal as three-dimensional (3D) audio through the speaker.

5. The aviation headset of claim 4, wherein the processor is configured to:
receive a plurality of audio signals from the audio panel, the received audio signals including a crew communication signal from a crew headsets and an air traffic control communication signal;
determine a relative direction of the crew headset; and
based on the relative direction of the crew headset, play the crew communication signal as 3D audio through the speaker.

6. The aviation headset of claim 5, wherein the processor is configured to:
receive a pilot communication signal from the microphone;
transmit the pilot communication signal to the passenger headset via the transceiver; and
transmit the pilot communication signal to the crew headset via the audio panel.

7. The aviation headset of claim 4, further comprising an isolation switch coupled to the processor, wherein:
a first operation of the isolation switch causes the passenger communication signal to be muted; and
a second operation of the isolation switch causes the passenger communication to be played through the speaker.

8. The aviation headset of claim 4, further comprising:
a white light configured to illuminate an area in front of the aviation headset with white light;
a red light configured to illuminate the area in front of the aviation headset with red light; and
a light switch coupled to the white light and the red light.

9. The aviation headset of claim 8, wherein:
a first operation of the light switch causes the red light to activate;
a second operation of the light switch causes the red light to deactivate and the white light to activate; and
a third operation of the light switch causes the white light to deactivate.

10. An aviation headset, comprising:
a microphone;
a transceiver;
a speaker; and
a processor coupled to the microphone, the transceiver, and the speaker, wherein the processor is configured to:
receive a plurality of audio signals from an audio panel via the transceiver, the received audio signals including a crew communication signal from a crew headset and an air traffic control communication signal;
determine a relative direction of the crew headset; and
based on the relative direction, play the crew communication signal as three-dimensional (3D) audio through the speaker.

11. The aviation headset of claim 10, wherein the processor is configured to:
receive a passenger communication signal from the microphone; and
transmit the passenger communication signal to the audio panel via the transceiver.

12. The aviation headset of claim 10, wherein the plurality of audio signals from the audio panel include a passenger communication signal from a passenger headset;
wherein the processor is configured to:
determine a relative direction of the passenger headset; and
based on the relative direction of the passenger headset, play the passenger communication signal as three-dimensional (3D) audio through the speaker.

13. The aviation headset of claim 12, further comprising an isolation switch coupled to the processor, wherein:
a first operation of the isolation switch causes the air traffic control communication signal to be muted; and
a second operation of the isolation switch causes the air traffic control communication signal to be played through the speaker.

* * * * *